United States Patent Office 2,741,534
Patented Apr. 10, 1956

2,741,534

METHOD FOR DISSOLVING METAL-FREE PHTHALOCYANINE PIGMENTS AND USE OF SOLUTION FOR DYEING

Charles John Pedersen, Salem, N. J., assignor to E. I. du Pont de Nemours and Company, Wilmington, Del., a corporation of Delaware No Drawing. Application May 15, 1952,
Serial No. 288,020

9 Claims. (Cl. 8—54.2)

This invention relates to a method for changing the physical state of metal-free phthalocyanine pigments. More particularly this invention deals with a process for forming solutions of metal-free phthalocyanine or its water-insoluble substitution derivatives whereby to make these colors available for dyeing cellulosic fiber.

It is an object of this invention to provide a method for dyeing cellulosic fibers such as textile fibers or paper with colors of the phthalocyanine series. Various additional objects and achievements of this invention will appear as the description proceeds.

As is well known, the phthalocyanine pigments are as a rule too insoluble for application to fiber from an aqueous bath. Many attempts have been made in the art to solubilize these compounds by introducing into their molecules various substituents, for instance sulfo groups. The resulting compounds have in some cases sufficient affinity for textile fiber to produce a dyeing of satisfactory strength, but the introduction of the mentioned substituents customarily has some detrimental side effects on the color, for instance by diminishing the good light-fastness and heat-stability, which have been the most valuable attributes of the phthalocyanine colors. Also, the shade of the color produced on the fiber is that of the substitution derivative, which is often not the same as the shade of the original metal or metal-free phthalocyanine.

Now according to this invention, the above problem is solved by a new method for changing the physical state of metal-free phthalocyanine pigments whereby to transform the same from the solid state into the form of a solution. The solution is not an aqueous one. Instead, it is a solution of the color in a solvent from a selected group, as more particularly set forth hereinbelow. But the solution is capable of penetrating cellulosic fiber, and when the impregnated fiber is subsequently treated with water or with a salt of copper or nickel, the initial metal-free phthalocyanine or the corresponding metal phthalocyanine is generated within the fiber, thus giving a dyeing corresponding in shade to the true color of the initial phthalocyanine or the corresponding metal phthalocyanine, as the case may be. Moreover, the dyeing retains the original light fastness of the color, and possesses furthermore excellent fastness to washing, soaping and crocking.

My novel method of forming a solution of a metal-free phthalocyanine pigment consists of treating the initial color, for instance metal-free phthalocyanine or a halogen derivative thereof, with a quaternary ammonium hydroxide in an organic liquid typified by pyridine, quinoline, 2-picoline, 2,6-lutidine, pyrrole, dimethyl-formamide and tetramethylene-sulfone. It will be noted that the organic liquids named are all of the type known as donor solvents. Stated in different words, the preferred liquids are non-acidic, polar solvents which contain one or more of the elements O, N and S, are stable in and dissolve the strong organic bases employed, and are capable of coordinating with the phthalocyanine salt by donating a pair of electrons whereby to dissolve said salt. While I do not wish to limit this invention to any particular theory, it appears to me that the quaternary ammonium hydroxide forms a salt with the phthalocyanine, the latter behaving like an acid in this respect and the two central hydrogen atoms being replaced by quaternary ammonium cations, while the solvent in some manner forms a loose addition compound, or "solvate," with the resulting salt.

If my theory is correct the hypothesized change may be expressed by the following equation, wherein Pc is employed as a symbol for the phthalocyanine "anion" (i. e., the molecule of metal-free phthalocyanine or halogenated metal-free phthalocyanine with its two central H atoms removed), while So is employed to represent a molecule of the solvent:

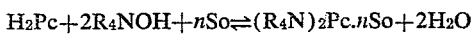

In this equation, $n$ represents an unknown integer. R₄NOH represents the quaternary ammonium hydroxide, which should preferably be of a strongly basic character, and therefore of an aliphatic nature. A convenient group to choose from are those which have at least three methyl or ethyl groups, and may therefore be termed quaternary trialkyl ammonium compounds. They may be defined by the general formula:

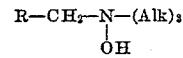

wherein (R—CH₂) jointly represents an alkyl, aralkyl or hydroxy-alkyl radical. Convenient practical illustrations of this group of agents are tetramethyl ammonium hydroxide, benzyl-trimethyl-ammonium hydroxide and beta-hydroxyethyl-trimethyl-ammonium hydroxide.

The quantity of the quaternary hydroxide should be not less than 2 moles per mole of phthalocyanine. Considerably larger quantities, however, may be employed, except for considerations of economy. The reaction is best effected in the total absence of water. In some instances, however, the quaternary ammonium hydroxide occurs in the form of an aqueous solution; in such event, it is desirable to use highly concentrated solutions thereof, so as to minimize the quantity of water.

Water has a decomposing effect on the solvate formed, and the equation hereinabove set forth therefore represents a reversible reaction. To keep the reaction going in the desired direction it is necessary to keep the quantity of water present at a minimum, and it is desirable to have the quantity of quaternary hydroxide as large as is practicable within economic limits.

In the next step of my invention, the solution of color above formed is applied to cellulosic fiber. In the case of textile fiber it is preferable to subject the fiber first to a wetting-out treatment, to open its pores. This may be achieved in any convenient manner, for instance by boiling the fiber successively in water and in a liquid monoalkyl ether of ethylene glycol. Impregnation may be effected in any convenient manner, for instance by immersion or spraying, or by printing the fiber with the color solution.

The next step is conversion of the solvated color to pigment within the fiber. This may be effected simply by rinsing the treated fabric with water at room temperature or at any other convenient temperature up to the boiling point, or if desired by steaming the impregnated fiber in a customary steam ager. This treatment results in precipitation of the original phthalocyanine within the fiber. The fabric is then soaped to remove any loose pigment, and dried.

An alternative method of decomposing the solvated color is to treat the impregnated fabric with a metal salt, preferably a salt of copper or nickel, in an organic solvent. Suitable salts for this purpose are the chlorides, sulfates, nitrates and acetates. Suitable solvents are the lower monoalkyl ethers of ethylene glycol.

To facilitate solution of the salt in the solvent, it is best to employ an ammine salt of the chosen metal or to add to the solvent ammonia or an organic amine to form an ammine salt in situ. The treatment may again be carried out at room temperature or at a higher temperature if specially desired.

In this modification of my invention the color precipitated in the fiber is copper phthalocyanine or nickel phthalocyanine, depending on the metal selected, or the corresponding metal polychloro-phthalocyanine if a polychloro metal-free phthalocyanine was initially employed.

Without limiting my invention, the following examples are given to illustrate my preferred mode of operation. Parts mentioned are by weight.

PART A.—DISSOLUTION OF THE COLOR

Example 1

Two parts of finely divided metal-free phthalocyanine were suspended in 500 parts of pyridine, and 2 parts of benzyltrimethylammonium hydroxide as a 40% aqueous solution were added. A blue-green solution was obtained. After clarification, a sample of this solution, when diluted with water, reprecipitated the metal-free phthalocyanine. When paper was dipped in the organic solution and then in water, it was dyed a pleasant blue shade.

Example 2

Two parts of finely divided metal-free phthalocyanine were suspended in 100 parts of tetramethylenesulfone, and 2 parts of benzyltrimethylammonium hydroxide as a 40% aqueous solution were added. A blue-green solution was obtained. Dilution of a sample of this solution with water precipitated metal-free phthalocyanine.

Similar results were obtained in the above procedure when the benzyltrimethylammonium hydroxide was replaced by an equal quantity of tetramethylammonium hydroxide.

Example 3

Two parts of finely divided metal-free phthalocyanine were suspended in 200 parts of pyridine, and 1 part of beta-hydroxyethyltrimethylammonium hydroxide was added. A blue-green solution was obtained. When a sample of this solution was treated with an excess of water, metal-free phthalocyanine was precipitated.

Example 4

Two parts of finely divided polychloro metal-free phthalocyanine (Cl content, over 45%) were suspended in 60 parts of pyridine and 2 parts of benzyltrimethylammonium hydroxide were added. The pigment dissolved completely to form a green solution. Hydrolysis of a sample of this solution by addition of an excess of water reprecipitated the polychloro metal-free phthalocyanine. When cotton was dipped in the organic solution and then in water it was dyed a pleasant green shade.

Quinoline or dimethylformamide when substituted for the pyridine in this example, give similar results.

PART B.—DYEING OF FIBER

Example 5

A piece of cotton was swollen by boiling for 5 minutes in water and then for 5 minutes in ethylene glycol monoethyl ether. It was then impregnated with the color solution obtained in Example 1, rinsed well with water, and finally soaped at the boil for 10 minutes in a 0.5% soap solution. A green-blue dyeing was obtained which exhibited excellent fastness to washing and crocking and good fastness to light.

Similar results were obtained when the same procedure was applied to the color solutions obtained in Examples 2, 3 and 4 above. The same process may also be used for dyeing paper and regenerated cellulose, except that the preliminary boiling-out treatment is omitted in the case of paper. Also, in lieu of steaming or rinsing, repeated dipping in warm water is recommended for hydrolysis of the phthalocyanine solution on paper goods.

Example 6

One and one-half parts of finely divided metal-free phthalocyanine were dissolved in 60 parts of pyridine with 2 parts of benzyltrimethylammonium hydroxide. The solution was clarified and used to impregnate a piece of cotton which had been swollen by boiling for 5 minutes in water and then for 5 minutes in ethylene glycol monoethyl ether. Excess liquid was removed from the cotton by pressing it between rollers. It was then placed immediately in a solution of 2 parts of anhydrous cupric chloride and 2 parts of ethylene diamine in 60 parts of ethylene glycol monoethyl ether. After 1 minute, the cotton piece was removed from the cupric salt solution and boiled for 15 minutes in a 0.5% solution of soap in water. A bright blue dyeing was obtained which exhibited excellent fastness to light and to washing, and good fastness to bleaching with sodium hypochlorite.

Tetramethylammonium hydroxide may be substituted for benzyltrimethylammonium hydroxide, and tetramethylenesulfone or dimethylformamide may be substituted for pyridine in the above procedure.

Example 7

A portion of the color solution prepared in Example 4 was used to impregnate a piece of cotton which had been swollen by boiling for 5 minutes in water and then for 5 minutes in ethylene glycol monoethyl ether. Excess liquid was removed from the cloth by pressing it between rollers. It was then placed immediately in a solution of 2 parts of anhydrous cupric chloride and 2 parts of ethylene diamine in 60 parts of ethylene glycol monoethyl ether. After 1 minute, the cotton piece was removed from the cupric salt solution and boiled for 15 minutes in a 0.5% soap solution. A bright green dyeing was obtained, that exhibited excellent fastness properties, including fastness to washing in the presence of sodium hypochlorite and fastness to light.

Example 8

The procedure was as in Example 6, except that 2 parts of anhydrous nickel chloride were employed in lieu of the copper salt therein mentioned. The results were similar, except that the dyeing was of a greener blue shade.

Example 9

The procedure was as in Example 7, except that 2 parts of anhydrous nickel chloride were employed in lieu of the copper salt therein mentioned. A similar green shade was obtained.

The procedures of Examples 6, 7, 8 and 9 may also be applied to the dyeing of paper and regenerated cellulose.

In lieu of the chlorides of copper and nickel, the respective sulfates, nitrates and acetates may be employed with similar results.

Numerous other variations in details will be readily apparent to those skilled in the art.

I claim as my invention:

1. A process of changing the physical state of a non-solubilized metal-free phthalocyanine pigment, which comprises reacting upon the same with a quaternary ammonium hydroxide in a solvent selected from the group consisting of pyridine, quinoline, 2-picoline, 2,6-lutidine, pyrrole and dimethylformamide, whereby to effect dissolution of the color in said solvent, said quaternary ammonium hydroxide being a compound of the general formula

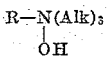

wherein Alk designates a lower alkyl radical, while R designates a lower alkyl, benzyl or hydroxyethyl radical.

2. A process as in claim 1, the treatment being effected at a temperature not exceeding 50° C.

3. A process of dyeing cellulosic fiber, which comprises dissolving a phthalocyanine pigment of the group consisting of metal-free phthalocyanine and halogenated metal-free phthalocyanine in a solvent as specified in claim 1, by a process as set forth in claim 1, impregnating the fiber with the resulting solution, and contacting said impregnated fiber with an agent of the group consisting of water and ionizable metal salts, whereby to convert the dissolved color to a phthalocyanine pigment within the fiber.

4. A process as in claim 3, wherein the conversion is effected by treating the impregnated fiber with water, whereby to regenerate a metal-free phthalocyanine within the fiber.

5. A process as in claim 3, wherein the conversion is effected by treating the impregnated fiber with a solution of a metal salt in an organic solvent, the metal salt being selected from the group consisting of ionizable copper salts and ionizable nickel salts, whereby to precipitate within the fiber the corresponding metal phthalocyanine.

6. A process as in claim 5, the organic solvent being a lower alkyl ether of ethylene glycol.

7. A process of dyeing cellulosic fiber, which comprises treating metal-free phthalocyanine with benzyl-trimethyl-ammonium hydroxide in a solvent selected from the group consisting of pyridine, quinoline, 2-picoline, 2,6-lutidine, pyrrole and dimethylformamide, whereby to effect dissolution of the color in said solvent, impregnating the fiber with said solution, and then treating the fiber with water whereby to regenerate metal-free phthalocyanine within the fiber.

8. A process of dyeing cellulosic fiber, which comprises treating metal-free phthalocyanine with benzyl-trimethyl-ammonium hydroxide in a non-acidic, polar solvent selected from the group consisting of pyridine, quinoline, 2-picoline, 2,6-lutidine, pyrrole and dimethylformamide, whereby to effect dissolution of the color in said solvent, impregnating the fiber with said solution, and then treating the fiber with a solution of cupric chloride in a lower alkyl ether of ethylene glycol, whereby to precipitate copper phthalocyanine within the fiber.

9. A process of dyeing cellulosic fiber, which comprises treating metal-free phthalocyanine with benzyl-trimethyl-ammonium hydroxide in a solvent selected from the group consisting of pyridine, quinoline, 2-picoline, 2,6-lutidine, pyrrole and dimethylformamide, whereby to effect dissolution of the color in said solvent, impregnating the fiber with said solution, and then treating the fiber with a solution of nickel chloride in a lower alkyl ether of ethylene glycol, whereby to precipitate nickel phthalocyanine within the fiber.

References Cited in the file of this patent
UNITED STATES PATENTS

| | | |
|---|---|---|
| 385,426 | Pennington | July 3, 1888 |
| 2,587,597 | Cook et al. | Mar. 4, 1952 |